No. 772,918. PATENTED OCT. 25, 1904.
A. S. BLOOM & A. E. KREBS.
COMBINED BLOWER AND FIRE SCREEN.
APPLICATION FILED SEPT. 4, 1903.
NO MODEL.
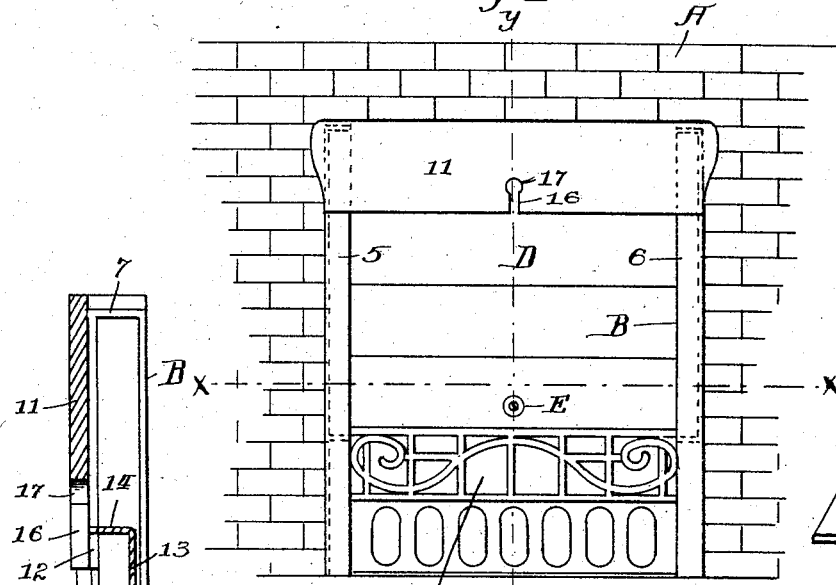
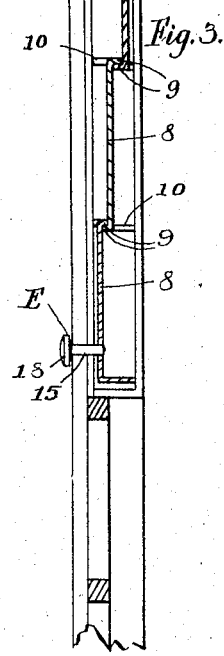
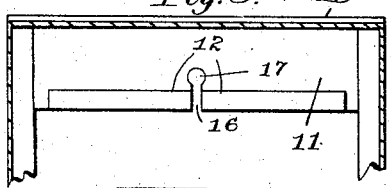
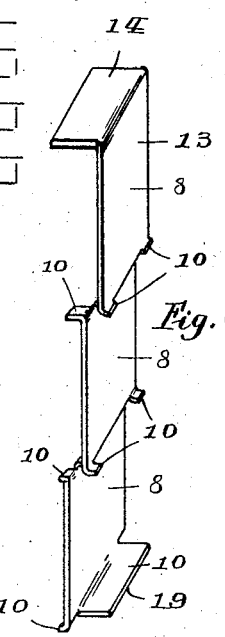
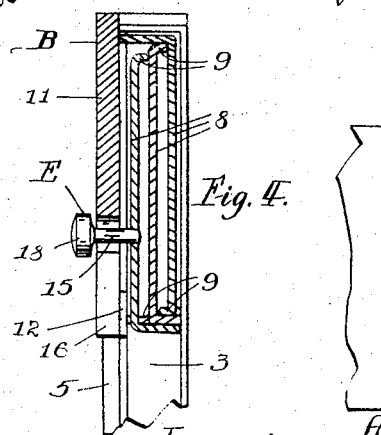
Witnesses:
E. M. Bosch
K. H. Hansen
Inventors: Aaron S. Bloom,
August E. Krebs,
by Stryker & Ladbury
Attorneys.

No. 772,918. Patented October 25, 1904.

UNITED STATES PATENT OFFICE.

AARON S. BLOOM AND AUGUST E. KREBS, OF ST. PAUL, MINNESOTA.

COMBINED BLOWER AND FIRE-SCREEN.

SPECIFICATION forming part of Letters Patent No. 772,918, dated October 25, 1904.

Application filed September 4, 1903. Serial No. 171,861. (No model.)

*To all whom it may concern:*

Be it known that we, AARON S. BLOOM and AUGUST E. KREBS, citizens of the United States of America, and residents of St. Paul, in the county of Ramsey and State of Minnesota, have invented certain new and useful Improvements in a Combined Blower and Fire-Screen, of which the following is a specification.

Our invention relates to improvements in a combined blower and fire-screen for use with open grates, and has for its object to provide a blower and screen which is sightly and always ready for instant use. With open fire-grates now in general use the blower is removed after the fire is started and is often misplaced and damaged while detached; nor are such blowers well adapted for use as a screen when the fire is not burning. With our invention these objections are overcome, as the same permanent attachment to the fireplace serves as both blower and screen.

In the accompanying drawings, forming part of this specification, Figure 1 is a front elevation of an open fireplace, showing our improved blower and fire-screen. Fig. 2 is a detail sectional view of Fig. 1, taken on the line X X. Fig. 3 is an enlarged detail sectional view taken on the line Y Y of Fig. 1, showing the blower and fire-screen lowered. Fig. 4 is another detail sectional view showing the blower and fire-screen raised. Fig. 5 is a detail view looking at the back of the frame of the fireplace, showing the blower and fire-screen removed. Fig. 6 is a perspective view of the blower and fire-screen, and Fig. 7 is a detail sectional view of the lock by which the blower and fire-screen is supported.

In the drawings let A represent an open fireplace which is provided with the frame B and grate C of any suitable construction. A pair of vertical channels 3 and 4 are formed on the sides 5 and 6 of the frame. These channels are preferably closed on their upper ends at 7. The blower and fire-screen D is sectional in construction and formed of a series of shutters or plates 8, which may be of any desired number. The ends of these plates work in the channels 3 and 4 and are formed with engaging lips or flanges 9, which prevent them from separating when they are extended, as shown in Fig. 3. The plates are also formed with clips 10, which work against the sides of the channels to assist in holding the plates together. The head-piece 11 of the frame is provided with a shoulder 12 on its inner face, and the upper plate 13 of the blower and fire-screen is bent so as to form a hook 14, which engages said shoulder when the plates are lowered. The plates close the opening in the frame above the grate and form a blower for starting the fire and a screen when the fire is not in use. When raised into the position shown in Fig. 4, the lock E engages the top piece 11 and supports the plates one behind another, thus leaving the frame open above the fire-grate. The lock E consists of a handle 18 with a shank 15, which is in cross-section a parallelogram with unequal sides and pivoted on the lower plate of the series. When in the position indicated in Fig. 7, the shank is adapted to enter the slot 16 as the plates are raised. The upper end of the slot is enlarged into a circular pocket 17. The shank when turned in the pocket to the position indicated by broken lines in Fig. 7 by means of the handle cannot pass through the narrower portion of the slot and locks the plates in raised or folded position. The closed ends 7 of the channels form stops for the ends of the plates, and the lip 19 on the lower plate assists in supporting the blower when raised.

Having described our invention, what we claim as new, and desire to protect by Letters Patent, is—

1. A device of the class set forth, consisting of a frame for open fireplaces, a series of shutters, straight and vertical channels in which the ends of said shutters are adapted to slide, clips on said shutters working against the sides of said channels to assist in holding the shutters together, and a lock for holding said shutters when they are folded into said frame.

2. A device of the class set forth, consisting of a frame, having straight and vertical channels, a series of shutters with ends adapted to work in said channels and close the opening in said frame above the fire-grate, lips on said shutters for supporting said shutters when lowered, clips on said shutters working against the sides of said channels to hold the shutters together, a lock on one of said shutters, and an engagement for said lock when said shutters are folded within said frame.

3. A device of the class set forth, consisting of a frame, having vertical channels, a series of shutters adapted to slide in said channels, and, when lowered, to close the opening above the fire-grate, means carried by said shutters for holding them in operative position in said channels, means for supporting said shutters when lowered, and a lock for supporting said shutters when raised.

4. A device of the class set forth, consisting of an open frame B, having vertical channels 3 and 4 and a shoulder 12, a series of shutters 8, sliding in said channels and adapted to close the opening in said frame, a hook 14 adapted to engage said shoulder, lips 9 by which the shutters are supported when they are lowered, a lock on one of said shutters, an engaging slot in said frame for the lock to enter, and a lip on the lower plate; said lock and lip being adapted to support the shutters when raised.

In testimony whereof we have signed our names to this specification in the presence of two subscribing witnesses.

AARON S. BLOOM.
AUGUST E. KREBS.

Witnesses:
E. M. BOESEL,
F. G. BRADBURY.